United States Patent [19]

Katagiri et al.

[11] 4,433,510

[45] Feb. 28, 1984

[54] METHOD FOR CONTROLLING THICKNESS OF WAFER-LIKE WORK PIECES UNDER LAPPING AND A LAPPING MACHINE THEREFOR

[75] Inventors: Kiyoo Katagiri; Mitsuo Honda, both of Niigata, Japan

[73] Assignees: Shin-Etsu Engineering Co., Ltd., Tokyo; Naoetsu Electronics Co., Ltd., Niigata, both of Japan

[21] Appl. No.: 364,799

[22] Filed: Apr. 2, 1982

[30] Foreign Application Priority Data

Apr. 10, 1981 [JP] Japan .................................. 56-53865

[51] Int. Cl.³ .......................................... B24B 49/04
[52] U.S. Cl. .................. 51/165 R; 51/118; 318/607
[58] Field of Search ................ 51/118, 283 R, 165 R, 51/165.77; 318/607

[56] References Cited

U.S. PATENT DOCUMENTS

| | | | |
|---|---|---|---|
| 3,089,292 | 5/1963 | Hunt | 51/118 |
| 3,848,368 | 11/1974 | Toshioka et al. | 51/165 R |
| 4,014,141 | 3/1977 | Riddle | 51/165 R |
| 4,199,902 | 4/1980 | Sauerland | 51/118 |
| 4,272,924 | 6/1981 | Masuko | 51/165 R |

*Primary Examiner*—Harold D. Whitehead
*Attorney, Agent, or Firm*—Hopgood, Calimafde, Kalil, Blaustein & Judlowe

[57] ABSTRACT

The present invention relates to an improvement in the lapping method of wafer-like work pieces in a lapping machine to lap the work pieces by sandwiching them between relatively rotatable upper and lower surface plates, in which the thickness of the work pieces under lapping is determined by an in-machine manner with a sensor mounted on the upper surface plate. Different from conventional lapping methods with an in-machine measurement of the thickness, the thickness of the work pieces is computed only once at regular intervals corresponding to one relative revolution of the surface plates so that the errors due to the operation per se of the lapping machine such as the undulated revolution of the surface plates, vibration of the machine and the like can be eliminated and very much improved control means for the thickness of the work pieces under lapping can be obtained.

2 Claims, 2 Drawing Figures

METHOD FOR CONTROLLING THICKNESS OF WAFER-LIKE WORK PIECES UNDER LAPPING AND A LAPPING MACHINE THEREFOR

BACKGROUND OF THE INVENTION

The present invention relates to an improved method for efficiently controlling the thickness of wafer-like work pieces under lapping and a lapping machine provided with such an improved means for in-machine controlling of the thickness of the wafer-like work pieces under lapping therein.

As is well known, a variety of wafer-like materials are currently used in the fields of, for example, electronics industry such as high-purity silicon semiconductors, GGG (gadolinium gallium garnet) single crystals for magnetic bubble domain memories, fused quartz glass plates used for masking in the patterning of IC circuits and the like. These materials are prepared first by slicing a block or rod of the respective materials into a wafer-like form which is then ground and lapped to have a specified thickness and surface smoothness in a lapping machine, for example, disclosed in U.S. Pat. No. 3,089,292.

Along with the development of the electronics technology, it is a recent trend that the requirement for the accuracy or uniformity of the thickness of such wafer-like materials as finished by lapping is increasing more and more. The most reliable way for the determination of the thickness of a wafer-like work piece under lapping is of course the direct measurement of the thickness of the work piece periodically taken out of the lapping machine by interrupting the operation. Needless to say, however, such an out-of-machine measurement of the thickness is impracticable with very low working efficiency.

Accordingly, there have been proposed several methods for the in-machine measurement of the thickness of the work pieces under lapping, i.e. without taking the work pieces out of the lapping machine to discontinue the operation of the lapping machine at a moment when the decreasing thickness of the work pieces under lapping has reached the desired or specified thickness.

One of the principles of such an in-machine thickness measurement is the utilization of an eddy current sensor fixedly mounted, for example, on the upper surface plate of the lapping machine to generate electric signals corresponding to the width of the gap between the upper and lower surface plates sandwiching the work pieces. The value obtained in such an eddy current sensor indirectly represents the thickness of the work pieces under lapping as the first approximation although several factors of error are involved therein.

For example, the value represented by the eddy current signal is not the exact thickness of the work piece but the width of the gap between the surface plates sandwiching the work pieces which is the summation of the thickness of the work piece and the thickness of the layers of the abrasive material or powder intervening between the surfaces of the work piece and the surfaces of the upper and lower surface plates.

Further, the surface of the surface plate itself is subject to abrasive wearing off throughout the course of lapping and the amount of wearing off of the upper surface plate holding the sensor gives a negative error to the value of the thickness of the work piece as represented by the eddy current signal.

Therefore, corrections should be made always on the value of the thickness of the work piece under lapping as determined from the signal obtained in the sensor mounted on the upper surface plate by subtracting the thickness of the layers of the abrasive material and by adding the thickness corresponding to the amount of wearing off of the upper surface plate estimated empirically.

Notwithstanding the above mentioned corrections effected on the value of the thickness of the work piece directly determined from the signal of the sensor means, the true thickness of the work piece taken out of the lapping machine after completion of the lapping often deviates considerably from the value expected from the recording of the in-machine measurement by use of the sensor means.

The inventors have conducted extensive investigations for the elucidation of the reason for the above mentioned deviation in the recording of the in-machine thickness measurement from the true thickness of the wafer-like work piece taken out of the lapping machine to establish an efficient and reliable method for controlling the thickness of the wafer-like work pieces under lapping.

SUMMARY OF THE INVENTION

An object of the present invention is therefore to provide a novel and improved method for controlling the thickness of wafer-like work pieces under lapping in a lapping machine by the in-machine measurement of the thickness by use of a sensor means fixedly mounted on a surface plate which is capable of giving a recording to give a very reliable value of thickness with least deviation from the true thickness of the work piece taken out of the machine after completion of lapping.

Another object of the invention is to provide a novel lapping machine in which lapping of wafer-like work pieces can be performed with very reliable control of the thickness of the work pieces under lapping by the in-machine measurement of the thickness with a sensor means fixedly mounted on a surface plate.

Thus, the present invention provides an improvement in a method for the determination of the thickness of wafer-like work pieces under lapping in a lapping machine as sandwiched between the lapping surfaces of an upper surface plate and a lower surface plate rotatable relative to each other by use of a sensor means fixedly mounted on one of the surface plates and generating a signal corresponding to the width of the gap between the lapping surfaces, which improvement comprises taking out the signal from the sensor means intermittently at regular intervals corresponding to one revolution of the upper and lower surface plates relative to each other.

The lapping machine of the present invention for lapping wafer-like work pieces provided with a device for the in-machine measurement of the thickness of the work pieces under lapping comprises:

(a) an upper surface plate having a substantially horizontal lapping surface;

(b) a lower surface plate rotatable relative to the upper surface plate and having a lapping surface substantially parallel with the lapping surface of the upper surface plate to hold the work pieces under lapping with the upper surface plate therebetween;

(c) a positioning means for generating a signal intermittently at regular intervals corresponding to one revolution of the lower surface plate relative to the upper surface plate;

(d) a sensor means for generating a signal corresponding to the width of the gap between the lapping surfaces of the upper and lower surface plates holding the work pieces therebetween; and (e) a means for converting the signal generated in the sensor means into a value of the width of the gap between the lapping surfaces at each moment when a signal is generated in the positioning means.

DETAILED DESCRIPTION OF THE PREFERRED EMBODIMENTS

As is mentioned above, the conventional methods for the in-machine measurement of the thickness of wafer-like work pieces under lapping in a lapping machine are more or less unavoidably subject to a considerable deviation of the thickness value expected from the recording of the in-machine measurement from the true thickness of the work pieces taken out of the lapping machine after completion of lapping.

The inventors have conducted analysis of the reason for the above deviation and discovered that the deviation is mainly due to the fluctuation of the width of the gap between the lapping surfaces during the operation of the lapping machine or revolution of the surface plates and due to the incomplete parallelism between the lapping surfaces and the undulating revolution and vibration of the surface plates so that, when the signals from the sensor means are recorded continuously, the recording necessarily fluctuates within a considerably wide range and can give no definite value of the thickness. Further analysis of the uncertainty in the recording resulted in a conclusion that such a fluctuation in the recording had a periodical nature with a period corresponding to one revolution of the surface plates relative to each other. In other words, the values of the thickness derived from the signal of the sensor means are relatively stable when the signal is taken only once in one revolution of the surface plate at the moments when the upper and lower surface plates are in the same relative position in revolution. Therefore, the in-machine measurement of the thickness in such a periodical manner would eliminate the errors caused by the undulating revolution and vibration of the surface plates to give a means for better control of the thickness of the wafer-like work pieces under lapping.

Figure 1:
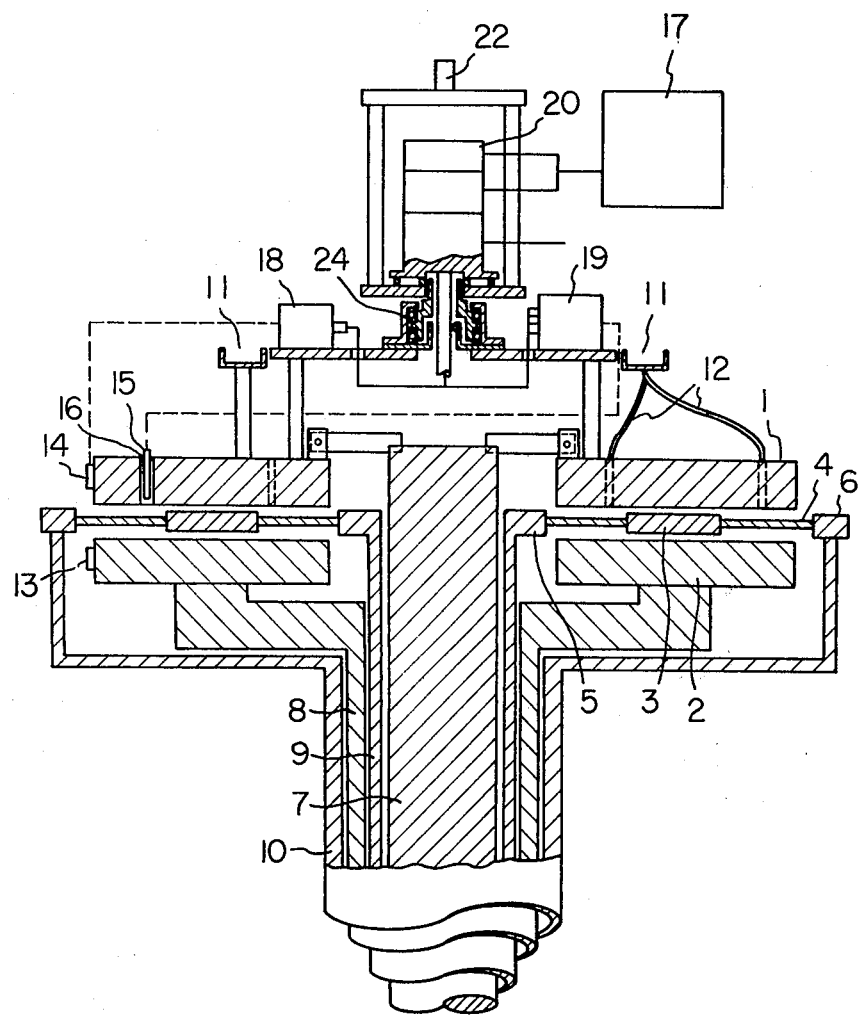
FIG. 1 is a vertical axial cross sectional view of an inventive lapping machine in the main part thereof.
Figure 2:
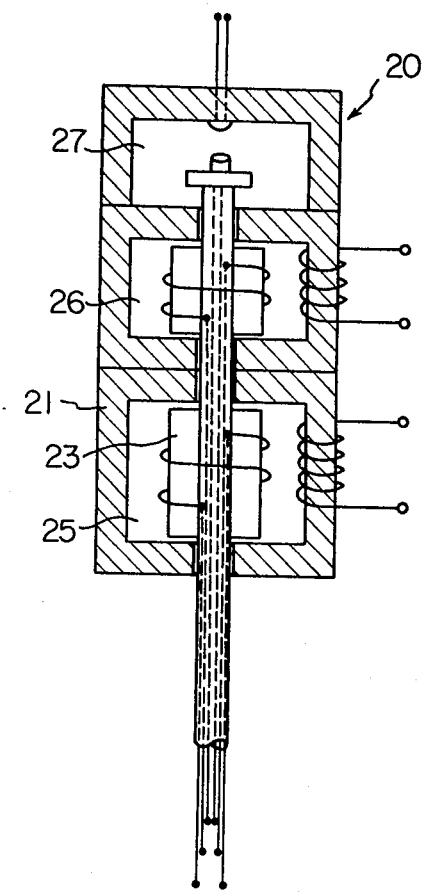
FIG. 2 is a cross sectional view of a rotary unit for transmitting the signals generated in the positioning and sensor means to the data-processing computer.

In the following, the invention is described in further detail with reference to the accompanying drawing, of which FIG. 1 is an axial cross sectional view of the inventive lapping machine and FIG. 2 is a cross sectional view of the rotary unit for the transmission of the signals from the lapping machine to the data-processing computer.

The lapping machine illustrated in FIG. 1 is of the same type in principle as those disclosed in U.S. Pat. No. 3,089,292. The main part of the machine is constructed with an upper lapping surface plate 1 and a lower lapping surface plate 2 each having an annular lapping surface and facing each other vertically making a narrow gap therebetween sandwiching a multiplicity of the work pieces 3 in several groups, each group being held by the respective work piece carrier 4. Each of the work piece carriers is driven in a planetary movement, i.e. in revolution around the center axis and around its own axis simultaneously, by the set of the sun gear 5 and the internal gear 6. The upper surface plate 1, lower surface plate 2, sun gear 5 and internal gear 6 are rotated independently by the respective shafts 7, 8, 9 and 10 driven by a driving unit (not shown in the figure).

In setting the work pieces 3 in the lapping machine, the upper surface plate 1 is raised by a suspending means (not shown in the figure) to make a sufficient space with the lower surface plate 2 and, after four to six work pieces are placed in the opening of each of three to five work piece carriers 4, the upper surface plate 1 is lowered to sandwich the work pieces 4 under its dead weight. While an aqueous suspension of an abrasive powder is supplied to the annular trough 11 to run therefrom through the pipes 12 down to the gap between the surface plates 1 and 2, the surface plates 1, 2, the sun gear 5 and the internal gear 6 are rotated respectively so that the surface of the work pieces 3 is ground or lapped by the abrasive action of the abrasive suspension intervening between the surfaces of the work piece 3 and the surface of the upper or lower surface plate 1, 2.

The lapping machine of the invention is provided with a positioning means for generating a signal intermittently at a regular interval corresponding to one revolution of the surface plates relative to each other. The positioning means of the machine illustrated in FIG. 1 is composed of a set of a transmitter 13 fixedly mounted on the lower surface plate 2 at the periphery thereof and a receiver 14 fixedly mounted on the upper surface plate 1 at the periphery thereof for receiving the signal emitted from the transmitter 13. Needless to say, the intensity of the signal received in the receiver 14 is the strongest at the moment when the receiver 14 is just above the transmitter 13 so that the maxima in the continuum of the signal received in the receiver 14 can be used as the positioning signal of the upper surface plate 1 relative to the lower surface plate 2.

On the other hand, a sensor 15 is fixedly mounted on the upper surface plate 1 for detecting the width of the gap between the surface plates 1 and 2 and generating a signal corresponding to the thus detected width of the gap which is, in the first approximation, equal to the thickness of the work pieces 3 under lapping.

The principle of the sensor 15 for the detection of the gap width is not limitative and various methods are known in the art. For example, the sensor 15 may be an eddy current detector of the electromagnetic coupling of the upper and lower surface plates, usually, made of cast-iron to generate an output signal corresponding to the gap width. Alternatively, the sensor 15 may be a combination of an ultrasonic emitter and a receiver for the echo of the ultrasonic waves reflected at the surface of the lower surface plate 2 to give the delay time of the echo corresponding to the gap width. At any rate, the sensor 15 is fixed on the upper surface plate 1 in the opening 16 provided in the upper surface plate 1 to directly face the lower surface plate 2.

The principle of the positioning means is also not limitative. For example, the transmitter 13 may be a permanent magnet coupled with a Hall element 14 to detect the magnetic flux around the permanent magnet 13. Alternatively, the transmitter 13 may be an ultrasonic emitter coupled with an ultrasonic receiver 14. At any rate, the transmitter 13 and receiver 14 are mounted on the respective surface plates 2 or 1 in such a manner that the latter passes just above the former as the surface plates are rotated relative to each other.

The signals from the positioning receiver 14 and the sensor 15 for the gap width are transmitted to a data-processing computer 17 installed outside the lapping machine. The signal of electric output from the sensor 15 for gap width detection is processed in the computer 17 with necessary corrections for the errors involved in the value of gap width directly obtained in the sensor 15 at every moment when the positioning signal from the receiver 14 is received in the computer 17. In other words, the value representing the thickness of the wafers under lapping is obtained only once in every revolution of the surface plates relative to each other at the moment when the upper and lower surface plates 1 and 2 are in the same relative angular position during their revolution.

As is explained before, the corrections should be effected to the value of the gap width in two respects. That is, a value corresponding to the positive error caused by the thickness of the layers of the abrasive suspension intervening between the surface of the work pieces and the surface of the surface plate must be subtracted from the value of the gap width as a function of the driving conditions of the surface plates, particle size distribution of the abrasive powder, feed rate of the abrasive suspension and the like parameters. Further, a value corresponding to the negative error due to the wearing off of the lapping surface of the surface plates, in particular, the upper surface plate 1 must be added to the value of the gap width although this correction is usually much smaller than the rate of the thickness decrease of the work pieces in the course of grinding or lapping. At any rate, these correction factors must be established empirically in advance as a function of various parameters and inputted to the computer 17 at each time of working or memorized in the memory of the computer. Insofar as the lapping works are conducted under the same working conditions for the same kind of the work pieces, it is sufficient that the once inputted correction factors are maintained as such throught the subsequent working runs.

The values of the thickness of the work pieces as computed by the computer 17 may be printed out, if desired, consecutively or at any time. It is also possible to program the computer 17 to generate a signal for discontinuing the operation of the lapping machine when the thickness of the work pieces has reached a preset value.

The signals produced in the positioning receiver 14 and the thickness sensor 15 must be by any manner of means transferred to the computer 17. Following is a description of typical one of such signal transmitting means though the mechanism is not particularly limited thereto.

The signals produced in the positioning receiver 14 such as a Hall element are introduced into the positioning signal processor 18 mounted on the upper surface plate 1 to amplify the signals from the receiver 14. The signals produced in the thickness sensor 15 are similarly introduced into the thickness signal processor 19 mounted on the upper surface plate 1 constructed, for example, with a bridge circuit and an amplifier. The signals processed in the processors 18, 19 are then led to the rotary unit 20 and taken out therefrom to be inputted into the computer 17. This rotary unit 20 also serves to supply electric power to the signal processors 18 and 19.

The structure of the rotary unit 20 is illustrated in FIG. 2 showing the axial cross sectional view thereof schematically. The stator 21 of the rotary unit 20 is fixed to the shaft 22 for the suspension of the upper surface plate 1 while the rotor 23 is fixed to the upper surface plate 1. The suspender shaft 22 serves merely to lift the upper surface plate 1 in the setting of the work pieces into the work piece carriers 4 on the lower surface plate 2 to make a sufficient room for the work and the upper surface plate 1 can be rotated independently of the shaft 22 during the operation of the lapping machine by means of the mechanism such as a thrust bearing 24.

The rotary unit 20 is composed of a rotary transformer 25 for power supply, a rotary pulse transformer 26 for the transmission of the positioning signals and a rotary photocoupler 27 for the transmission of the thickness signals. The stator coil of the rotary transformer 25 is connected, for example, to a power supply and the stator coil of the rotary pulse transformer 26 and one of the output lead wires of the rotary photocoupler 27 are respectively connected to the computer 17. The rotor coils of the rotary transformer 25 and the rotary pulse transformer 26 and the other output lead wire of the rotary photocoupler 27 are connected to the signal processors 18 and 19, respectively, through the hollow shaft of the rotor 23.

The structure of the rotary unit 20 is of course not limited to the above described one composed of the rotary transformer 25, rotary pulse transformer 26 and rotary photocoupler 27 and conventional mechanisms including brushes and slip rings may be used. The above described mechanism is, however, more advantageous than the conventional ones because of the absence of any mechanical contact in which electric noises are more or less unavoidable in the signals transmitted to the computer 17 so that remarkably improved accuracy of the thickness determination can be ensured.

It is of course an alternative way of signal transmission that the signals are transmitted by a wireless means as electromagnetic waves modulated by the signals from the positioning receiver 14 and the thickness sensor 15 and received in a wireless receiver installed outside the lapping machine to be introduced into the computer 17.

As is described in the above, the principle of the inventive method is the determination of the thickness of the wafer-like work pieces only once in every relative revolution of the surface plates at the moments under control of the positioning means with suitable computerized corrections so that the results of the measurements are free from the errors caused by the operation of the lapping machine due to the undulated revolution of the surface plates, vibration of the machine, inadvertent irregularities on the lapping surface and the like. Therefore, the wafer-like work pieces finished by the inventive method are subject to less variation in the thickness or less deviation from the desired thickness. In an example, the thickness of the work pieces was well within a deviation of ±3 μm from the desired value in a percentage of 96–97% while the corresponding value in the conventional method was 82–83%.

Further advantage of the invention is obtained in the working efficiency of lapping works. It is usual in the conventional time-controlled lapping works to carry out sorting of the work pieces by the thickness, periodical checking of the thickness of the work pieces under lapping and re-setting of the work pieces twice or thrice while such inefficiency in the lapping works can be completely eliminated in the inventive method. Such a simplified handling of the work pieces naturally decreases the breakage loss of the work pieces to contribute to the improvement of the product yield as well as to the reduction of the labor to a great extent.

What is claimed is:

1. In a method for the in-machine measurement of the thickness of wafer-like work pieces under lapping in a lapping machine as sandwiched between the lapping surfaces of an upper surface plate and a lower surface plate rotatable relative to each other by use of a sensor means fixedly mounted on one of the surface plates and capable of generating a signal corresponding to the width of the gap between the lapping surfaces, an improvement which comprises taking out the signal from the sensor means intermittently at regular intervals corresponding to one revolution of the upper and lower surface plates relative to each other.

2. A lapping machine for lapping wafer-like work pieces provided with a device for the in-machine measurement of the thickness of the work pieces under lapping which comprises:

(a) an upper surface plate having a substantially horizontal lapping surface;

(b) a lower surface plate rotatable relative to the upper surface plate and having a lapping surface substantially parallel with the lapping surface of the upper surface plate to hold the work pieces under lapping with the upper surface plate therebetween;

(c) a positioning means for generating a signal intermittently at regular intervals corresponding to one revolution of the lower surface plate relative to the upper surface plate;

(d) a sensor means for generating a signal corresponding to the width of the gap between the lapping surfaces of the upper and lower surface plates holding the work pieces therebetween; and (e) a means for converting the signal generated in the sensor means into a value of the width of the gap between the lapping surfaces at each moment when a signal is generated in the positioning means.

* * * * *